3,105,066
POLYMERIZATION CATALYSTS
James C. MacKenzie, Wellesley Hills, Mass., assignor to Cabot Corporation, Boston, Mass., a corporation of Delaware
No Drawing. Filed Nov. 30, 1959, Ser. No. 855,984
9 Claims. (Cl. 260—93.7)

This invention relates to the polymerization of α-mono-olefins such as ethylene, propylene and styrene and the copolymerization of diverse α-mono-olefins and includes within its scope improved catalysts for such polymerization reactions comprising a halogenated oxide of a metal from groups Va, VIa, VIIa, or period 4 of group VIIIb in combination with an organo-metallic compound of a group I, II or III metal, where the group numbers used all correspond to the Mendeleev Periodic System.

Accordingly, it is a principal object of the present invention to provide a novel process for polymerizing α-mono-olefins and mixtures thereof.

Other objects of the present invention will in part be obvious and will in part appear hereinafter.

It is known that in many cases, α-mono-olefins can be polymerized by contact with a catlayst comprising an oxide of a group Va, VIa, VIIa, or VIIIb metal in combination with an organometallic compound.

However, in accordance with the present invention, it was discovered that an enormously more efficient catalyst is produced when the group Va, VIa, VIIa or period 4 of group VIIIb metal oxide in question is surface halogenated prior to mixing with the organometallic compound. The polymerization or copolymerization reaction can be effected at suitable temperatures within the range of from about —20° C. to about 250° C., and pressures ranging upwardly from atmospheric to any desired maximum pressure, for example, 30,000 p.s.i. or even higher pressures, but preferably between about 200 and about 5000 p.s.i.

In the interests of brevity and clarity only the chlorinated oxides of said metals are initially mentioned and discussed in the specification. Clearly other surface halogenated metal oxides from the same groups such as brominated and iodinated metal oxides are suitable for the purposes of the present invention. Accordingly, it is desired that it be clearly understood that chlorinated oxides are utilized merely as specific examples for the purposes of illustration, that other halogenated oxides can be utilized for the purposes of the present invention and that this initial mention of only chlorinated oxides is not intended to limit the present invention in any way.

Halogenation of the various metal oxides can be accomplished in a number of ways: Specifically, chlorination can be accomplished by (a) treatment with thionyl chloride at temperatures between about 25° C. and 100° C. for about 5 hours, (b) treatment with gaseous chlorine at temperatures between about 100° C. and 800° C. for periods from about 15 minutes up to about one hour, and (c) treatment with hydrogen chloride gas at temperatures between about 150° C. and 500° C. for from about 15 minutes to about 2 hours. Many other chlorinating agents such as carbon tetrachloride, silicon tetrachloride, carbon monoxide-chlorine mixtures, phosgene and the like are also suitable for the purposes of the present invention. However, it should be pointed out that care must be taken during the surface halogenation operation to the end that the halogenation not be carried too far. For example, in the process of surface chlorinating chromium oxide, care should be taken to the end that substantial amounts of chromium trichloride not be produced. Accordingly, the conditions, primarily the temperature, must be effectively controlled during chlorination in order to prevent the production of completely halogenated compounds such as chromium trichloride. Although such completely halogenated compounds, e.g. chromium trichloride, can be removed by extraction, it is obviously more desirable to avoid such additional steps. Suitable conditions for the avoidance of the production of appreciable amounts of completely halogenated metal compound for any particular group Va, VIa, VIIa or VIIIB metal oxide in combination with any particular halogenating agent can be readily determined.

The manner in which halogenation of the oxides is accomplished is not critical. Specifically, halogenation can be accomplished (a) in a fixed bed by flowing the halogenating agents, such as $Cl_2$, $Br_2$, etc., therethrough, (b) in a closed container by immersing the oxides to be treated in a suitable solution such as a solution of thionyl chloride, (c) by exposing the oxides to vapors of the halogenating agents, such as HCl vapors, and in many other ways.

Neither is the extent of halogenation of said metal oxides highly critical. However, the efficiency of the surface halogenated oxides of this invention as catalyst components in the systems described, e.g. in terms of weight of polymer producible per unit weight of catalyst employed, is generally highly dependent upon the relative amount of halogenated metal oxide present on the surfaces thereof. This in turn is dependent largely on two main factors, each of which is separately controllable to a large extent. The first factor in question is the molar quantity of active metal (i.e., a metal from group Va, VIa, VIIa or period 4 of the group VIIIB) which is available in the surface per unit weight of the material to be surface halogenated. For a relatively pure oxide of a given metal this first factor is largely a matter of the fineness of subdivision of the form in which said oxide is available, the upper limit clearly being reached when it is so fine that substantially all of said metal oxide present is on the surface. The second factor in question is the proportion of said metal oxide which is actually surface halogenated.

In view of the above discussion it is clear that in preparing surface halogenated oxides starting with solid oxides of any given active metal, the smaller the average particle size of said solid oxide, the greater will be the potential efficiency of the resulting catalyst component producible therefrom. However, because of the enormous catalytic activity of said surface halogenated metal oxides, their particle size is generally not critical. As a matter of fact, in the present case, it is entirely feasible to use as the starting material (in making the surface halogenated oxides of the present invention) oxides having an average equivalent particle diameter even greater than 1 micron, e.g. ¼ inch.

In short, to reduce this discussion of extent of halogenation to the simplest possible terms, it is believed the extent of halogenation of said surface halogenated metal oxides of the present invention can best be described and specified as follows: Preferred for imparting optimum catalytic activity and providing maximum catalyst efficiencies when used with a given organometallic compound in a given system are those surface halogenated metal oxides in which the extent of said surface halogenation amounts to between about 0.1 and about 10 milliequivalents of halogen per gram of said surface halogenated oxide. Still quite useful and practical, however, particularly when for other reasons amounts of 1 part or more by weight of the surface halogenated metal oxide per 100 parts of the polymer product are desired, are those surface halogenated oxides of a metal from group Va, VIa, VIIa or period 4 of group VIIIB, in which the extent of surface halogenation totals as little as 0.01 milliequivalent of halogen per gram of said surface halogenated oxide.

In accordance with the present invention, it was also discovered that the superior catalysts of the present invention are formed when the aforesaid surface halogenated metal oxides are combined with any compound conforming to the general formula:

$$MM'_vX_nR_{y-n}$$

wherein M is a metal chosen from groups, I, II or III; M' is a metal from group I; $v$ equals 0 or 1; each X is a halogen; $n$ equals 0, 1 or 2; each R is any monovalent hydrocarbon radical or hydrogen; $y$ is an integer equal to the combined valence represented by M and M' and thus equals, 1, 2, 3 or 4; and wherein $y-n$ equals at least 1.

Compounds of a single group I, II or III metal which are suitable for the practice of the invention include compounds conforming to the subgeneric formula:

$$M(R)_k$$

wherein M is a group I, II or III metal, such as, lithium, sodium, beryllium, barium, boron, aluminum, copper, zinc, cadmium, mercury and gallium; wherein $k$ equals 1, 2 or 3 depending upon the valency of M which valency in turn depends upon the particular group (i.e. I, II or III) to which M belongs; and wherein each R may be any monovalent hydrocarbon radical. Examples of suitable R groups include an aryl or alkaryl radical, aliphatic hydrocarbon radical or derivative, such as alkyl, cycloalkylalkyl, cycloalkenylalkyl, arylalkyl, cycloalkyl, alkylcycloalkyl, arylcycloalkyl, cycloalkyl, alkenyl.

Specific examples of R groups for substitution in the above formula include methyl, ethyl, n-propyl, isopropyl, isobutyl, n-amyl, isoamyl, hexyl, n-octyl, n-dodecyl, and the like; 2-butenyl, 2-methyl-2-butenyl and the like; cyclopentylethyl, 4-cyclohexenylethyl and the like; 2-phenylethyl, 2-phenylpropyl, α-naphthylethyl, methyl-naphthylethyl, and the like; cyclopentyl, cyclohexyl, 2,2,1-bicycloheptyl, and the like; methylcyclopentyl, dimethylcyclohexyl, ethylcyclohexyl, isopropylcyclohexyl, 5-cyclopentadienyl, and the like; phenylcyclohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, and cyclohexylphenyl.

Generally preferred, however, are group I, II and III metal alkyls, such as methyl- and butyllithium, pentenylsodium, cyclopentadienylsodium, dihexylmercury, diallylmagnesium, diethylcadmium, benzylpotassium, divinylmagnesium, di-p-tolylmercury, diethylzinc, tri-n-butylaluminum, methyl phenylmercury, diisobutyl ethylboron, diethylcadmium, di-n-butylzinc and tri-n-amylboron, and in particular the aluminum alkyls, such as trihexylaluminum, triethylaluminum, trimethylaluminum, and in particular, triisobutylaluminum.

In addition, mono- and di-halides of group II or III metals conforming to the above general formula are also suitable. Specific examples of such compounds are diisobutylaluminum bromide, isobutylboron dichloride, methylmagnesium chloride, phenylmercuric iodide, ethylberyllium chloride, ethylcalcium bromide, hexylcupric chloride, diisobutylaluminum hydride, methylcadmium hydride, diethylboron hydride, hexylberyllium hydride, dipropylboron hydride, octylmagnesium hydride, butylzinc hydride, dichloroboron hydride, dibromoaluminum hydride and bromocadmium hydride.

Also, compounds comprising a group I, II or III metal compound complexed with a group I metal compound if they conform to the above general formula, are generally suitable. Examples of such compounds are tetraethyllithium aluminum, tetrahexyllithium aluminum, trihexylpotassium aluminum chloride, triethyllithium aluminum bromide, tributylsodium zinc, tributyllithium zinc, trioctadecylpotassium aluminum hydride, diphenyldilithium and diphenylpotassium lithium.

Although it is appreciated that when R, in the above defined general formula, does not comprise at least one hydrocarbon radical, the group I, II and III metal compounds of the present invention can not normally be termed organometallic compounds, compounds lacking at least one hydrocarbon radical comprise such a relatively small number of the total number of compounds included by said general formula that for the purposes of the present invention, it is intended that these compounds be included within the generic term, organometallic compound. Accordingly, in the specification and in the claims, it is intended, and therefore it should be understood, that the term, organometallic compound, refers to all the compounds included within the scope of the above defined general formula:

$$(MM'_vX_nR_{y-n})$$

Polymerization of the olefinic charging stock can be accomplished in the gas phase, but it is highly desirable to effect polymerization in the presence of a substantially inert liquid reaction medium which functions as partial solvent for the monomer, a solvent for the organometallic compound, and as a liquid transport medium to remove normally solid polymerization products as a dispersion from the polymerization reactor, thus permitting efficient and continuous polymerization operations. Accordingly, an inert liquid reaction medium is preferably supplied to the reaction zone.

Several classes of hydrocarbon or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquified alkanes such as propane, butanes, n-pentane, n-hexane, 2,3-dimethylbutane, n-octane, isooctane (2,2,4-trimethylpentane), n-decane, n-dodecane, cyclohexane, methylcyclohexane, dimethylcyclopentane, ethylcyclohexane, decalin, methyldecalins, dimethydecalins, and the like are suitable. Also members of the aromatic hydrocarbon series, such as ethylbenzene, isopropylbenzene, sec-butylbenzene, t-butylbenzene, ethyltoluene, ethylxylenes hemimellitene, pseudocumene, perhnitene, isodurene, diethylbenzenes, isoamylbenzene, and particularly the mononuclear aromatic hydrocarbons such as benzene, toluene, xylenes, mesitylene and xylene-p-cymene mixtures, and the like are completely suitable. Aromatic hydrocarbon fractions obtained by the selective extraction of aromatic naphthas, from hydroforming operations such as distillates or bottoms, from cycle stock fractions or cracking operations, etc., and certain alkyl naphthalenes which are liquid under the polymerization reaction conditions, for example, 1-methylnaphthalene, 2-isopropylnaphthalene 1-n-amylnaphthalene and the like, or commercially produced fractions containing these hydrocarbons and the like are also suitable.

The proportion of surface halogenated metal oxide to organometallic compound utilized in preparing the catalyst is not usually a critical feature of the process. Moreover, if this proportion is expressed as a simple molar or weight ratio it may not be particularly meaningful because as indicated above the efficiency of said surface chlorinated oxides (on a weight or molar basis) is highly dependent upon the extent of surface halogenation. Accordingly, such a proportion in order to be generally meaningful should be expressed in terms of the extent of surface halogenation. We have found from experience that a ratio of from 0.05 to 10 mols of the organometallic compound per equivalent of surface halogen on the chlorinated oxide used covers the optimum range of proportions.

The total quantity of catalyst i.e., comprising both the halogenated metal oxide and the group I, II or III metal compound, to be utilized in the polymerization reaction of this invention may vary from very small amounts to very large amounts, the precise amount selected for use being dependent upon the desired rate of polymerization, the geometry of the reaction zone, the composition of the particular olefinic charging stock, temperature and other reaction variables. It should be pointed out that in general the efficiency of the catalysts of the present invention is extremely high and accordingly the total quantity of catalyst that need be employed based on the weight of the charging stock is very small, particularly when a very fine particle size oxide is utilized.

Harmful impurities in the liquid hydrocarbon reaction medium can be effectively neutralized prior to the formation therein, or addition thereto, of the catalyst or catalyst components by treating the liquid medium with a metal alkyl or a transition metal compound as set forth in the copending applications of Adam Orzechowski and James C. MacKenzie, U.S. Serial Nos. 730,519, now abandoned, and 784,038, now Patent No. 2,991,157, filed April 24, 1958, and December 31, 1958, respectively. The olefinic charging stocks can be purified by any known means such as bubbling said stocks through a solution of a metal alkyl in a hydrocarbon solvent prior to introducing them into the polymerization reactor.

Temperature control during the course of the polymerization process can be readily accomplished owing to the presence in the reaction zone of a large liquid mass having relatively high heat capacity. The liquid hydrocarbon reaction medium can be cooled by heat exchange inside or outside the reaction zone.

The contact time or space velocity employed in the polymerization process will be selected with reference to the other process variables such as the particular catalysts utilized, the specific type of product desired, and the extent of olefin conversion desired in any given run or pass over the catalyst. In general, this variable is readily adjustable to obtain the desired results.

There follow a number of illustrative non-limiting examples:

*Example 1*

A 425 cc. stainless steel bomb was charged with 5.6 g. of alumina supported $Cr_2O_3$ having a surface area of about 70 m.$^2$/g. and comprising 20% by weight $Cr_2O_3$ which had previously been heated for 24 hours at 120° C. and subsequently refluxed in isooctane for about 6 hours, 200 ml. of isooctane and 7.5 g. of aluminum triisobutyl which was charged under the surface of the isooctane. A total of 25 g. of ethylene was charged into the bomb. The contents of the bomb were continuously stirred and the temperature thereof maintained at about 50–55° C. for 68 hours. The initial pressure at room temperature was 286 p.s.i. and the maximum pressure was about 298 p.s.i. The reaction products were analyzed and it was found that 1.38 g. of ethylene had been converted to an extremely high molecular weight polymer which was essentially insoluble in boiling xylenes. This polymer was found to have a crystalline melting point of about 129.5° C. and was a tough, flexible material. It was further found that none of the ethylene had been converted to normally gaseous or normally liquid products. When either the $Cr_2O_3$ or aluminum triisobutyl alone was used as the catalyst, ethylene was not converted to a solid polymer.

*Example 2*

This example was a duplicate of Example 1 except that the $Cr_2O_3$ instead of being refluxed in isooctane was treated with HCl vapors at a temperature of from 190–320° C. The chlorinated $Cr_2O_3$ was then repeatedly washed with isooctane and the wash solution tested to insure the non-existence therein of free chlorides of chromium such as chromium trichloride. The extent of chlorination of the $Cr_2O_3$ was found to be 1.2 milliequivalents of chlorine per gram of $Cr_2O_3$. In this example the temperature of 50–55° C. was maintained in the polymerization bomb for 66 hours instead of 68 hours. The reaction products were analyzed and it was found that 19.2 g. of ethylene had been converted to an extremely high molecular weight polymer which was found to have a crystalline melting point of about 131° C. and was a tough, flexible material. It was further found that none of the ethylene had been converted to normally gaseous or normally liquid products.

When the chlorinated $Cr_2O_3$ alone was utilized as the catalyst, ethylene was not converted to a solid polymer.

Substantially the same results can be obtained by substituting $Cr_2O_3$ treated with HBr for 4 hours at a temperature of about 220–240° C. for the aforesaid chlorinated $Cr_2O_3$.

*Example 3*

A one liter stainless steel autoclave was charged with 2.4 g. of alumina supported $MoO_3$ having a surface area of about 186 m.$^2$/g. and comprising about 10% by weight $MoO_3$, which had previously been refluxed in isooctane to which was incrementally added, over a period of 7 hours, a total of 2.5 millimoles $SOCl_2$, at which time the extent of chlorination of the $MoO_3$ was found to be 17 milliequivalents of chlorine per gram of $MoO_3$, 138 g. of isooctane, and 8 g. of aluminum triisobutyl which was charged under the surface of the isooctane. A total of 35 g. of ethylene was charged into the autoclave. The contents of the autoclave were continuously stirred and the temperature thereof maintained at 85° C. for 3.75 hours. The initial pressure was about 250 p.s.i. The reaction products were analyzed and it was found that 11.1 g. of ethylene had been converted to an extremely high molecular weight polymer which was essentially insoluble in boiling xylenes. This polymer was found to have a crystalline melting point of about 132° C. and was a tough, flexible material. It was further found that none of the ethylene had been converted to normally gaseous or normally liquid products.

*Example 4*

A 425 cc. stainless steel bomb was charged with 5 g. of surface chlorinated, alumina supported vanadium oxide containing 10% by weight vanadium oxide and having a chlorine content of 9.3 milliequivalents per gram of vanadium oxide which had been prepared by treating the vanadium oxide with HCl vapors for 5.1 hours at a temperature of from 132° C.–160° C. and then washing the vanadium oxide repeatedly in isooctane, 138 g. of isooctane and 1.8 g. of aluminum triisobutyl which was charged under the surface of the isooctane. 25 g. of ethylene was charged to the bomb. The contents of the bomb were agitated and the temperature thereof maintained at 50° C. for 21.5 hours. The initial pressure at room temperature was 320 p.s.i. The reaction products were analyzed and it was found that 10.4 g. of ethylene had been converted to an extremely high molecular weight polymer which was essentially insoluble in boiling xylenes. This polymer was found to have a crystalline melting point of about 129.5° C. and was a tough, flexible material. It was further found that none of the ethylene had been converted to normally gaseous or normally liquid products.

Substantially the same results can be achieved by substituting iodinated vanadium oxide for chlorinated vanadium oxide in the above example.

*Example 5*

A 425 cc. stainless steel bomb was charged with 2.8 g. of an inert-carrier-supported $MnO_2$ having a surface area of about 186 m.$^2$/g. and comprising about 10% by weight $MnO_2$ which had previously been heated for 24 hours at 120° C. and subsequently refluxed in isooctane for about 2.5 hours and then repeatedly washed in isooctane, 138 g. of isooctane, and 0.45 g. of aluminum triethyl which was charged under the surface of the isooctane. A total of 25 g. of ethylene was charged into the bomb. The contents of the bomb were continuously stirred and the temperature thereof maintained at 50° C. for 65.6 hours. The initial pressure was about 278 p.s.i. The reaction products were analyzed and it was found that none of the ethylene had been converted to a solid polymer.

Example 6

This example was a duplicate of Example 5 except that the $MnO_2$ instead of simply being refluxed in isooctane was refluxed in isooctane to which was incrementally added 2.3 millimoles $SOCl_2$ for a total of 6 hours and then repeatedly washed with isooctane, after which the chlorine content of the treated oxide was 7.5 milliequivalents per gram of $MnO_2$. The chlorinated $MnO_2$ was then repeatedly washed with isooctane and the wash solution tested to insure the non-existence therein of manganese chlorides. Also in this example because ethylene was continuously readily consumed during the run an additional 25 g. of ethylene was charged into the bomb during the run in addition to the original ethylene charge of 25 g., to give a total ethylene charge of 50 g.

The reaction products were analyzed and it was found that 26.9 g. of ethylene had been converted to an extremely high molecular weight polymer which was found to have a crystalline melting point of about 130.8° C. and was a tough, flexible material. Substantially the same results can be achieved if surface brominated $MnO_2$ is utilized in this example instead of surface chlorinated $MnO_2$.

Example 7

A 425 cc. stainless steel bomb was charged with 4.3 g. of $Fe_3O_4$ having an average particle diameter in the sub micron range which had previously been heated for 24 hours at 120° C. and subsequently refluxed in isooctane for about 6 hours, 200 ml. of isooctane and 0.8 g. of aluminum triisobutyl which was charged under the surface of the isooctane. A total of 25 g. of ethylene was charged into the bomb. The contents of the bomb were continuously stirred and the temperature thereof maintained at about 50° C. for 163 hours. The initial pressure at room temperature was 282 p.s.i. and the maximum pressure was about 284 p.s.i. The reaction products were analyzed and it was found that none of the ethylene had been converted to a solid polymer.

Example 8

This example was a duplicate of Example 7 except that the $Fe_3O_4$ instead of simply being refluxed in isooctane was refluxed in isooctane to which was incrementally added 4.3 millimoles of $SOCl_2$ over a period of 11 hours at which time the chlorine content of the $Fe_3O_4$ had reached 0.53 milliequivalent per gram $Fe_3O_4$ on the dry basis. The chlorinated $Fe_3O_4$ was then repeatedly washed with isooctane and the wash solution tested to insure the non-existence therein of iron chlorides. Also, the temperature of 50°–55° C. was maintained for 66 hours instead of 68 hours. The reaction products were analyzed and it was found that 6.7 g. of ethylene had been converted to an extremely high molecular weight polymer which was found to have a crystalline melting point of about 130.5° C. and was a tough, flexible material. It was further found that none of the ethylene had been converted to normally gaseous or normally liquid products.

When the chlorinated $Fe_3O_4$ alone was utilized as the catalyst, ethylene was not converted to a solid polymer.

Substantially the same results can be obtained by substituting $Fe_3O_4$ treated with HBr for 11 hours at a temperature of about 90° C. for the aforesaid chlorinated $Fe_3O_4$.

In one embodiment of the present invention, hydrogen is introduced into the reaction zone during the polymerization reaction. The introduction of hydrogen is not essential but generally substantially improves the yield and produces a larger proportion of product which is soluble in boiling xylene. Although, the exact function of the hydrogen is not completely understood, and there is therefore, no intention to be bound by this explanation, it is believed that the hydrogen serves as a chain transfer agent, thereby promoting the dissociation of polymer chains from the polymerization sites of the catalyst and aiding in the initiation and formation of additional polymer chains on said catalyst sites.

A non-limiting illustrative example follows:

Example 9

A 425 cc. stainless steel bomb under 1 atmosphere of hydrogen was charged with 2.79 g. of surface chlorinated, alumina supported $MnO_2$, which had a surface area of about 186 m.$^2$/g. comprised about 10% by weight $MnO_2$, and had a chlorine content of about 7.5 milliequivalents per gram of $MnO_2$, which surface chlorinated $MnO_2$ had been prepared by heating the $MnO_2$ for 24 hours at 120° C., subsequently refluxing it for about 6 hours in isooctane to which had been added incrementally a total of 2.3 millimoles of $SOCl_2$, and finally repeatedly washing it with isooctane. A total of 105 g. of propylene was charged to the bomb. The contents of the bomb were then agitated and the temperature thereof maintained at about 50° C. for 70.5 hours. The initial pressure at room temperature was about 170 p.s.i. and the maximum pressure was about 258 p.s.i. The reaction products were analyzed and it was found that 11 g. of propylene had been converted to an extremely high molecular weight polymer which was essentially insoluble in boiling diethylbenzene. This polymer was found to have a crystalline melting point of about 168° C. and was a tough, flexible material. It was further found that none of the propylene had been converted to normally gaseous or normally liquid products.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polyolefins.

Also, the polymers produced by the process of the present invention, especially the polymers having high intrinsic viscosities, can be blended with lower molecular weight polymers to impart stiffness or other desired properties thereto. The solid resinous products produced by the process of the present invention can, likewise, be blended in any desired proportions with hydrocarbon oils, with waxes, such as paraffin or petrolatum waxes, with ester waxes, with high molecular weight polybutylenes, and with other organic materials. Small proportions between about 0.01 and about 1 percent of the various polymers produced by the process of the present invention can be dissolved or dispersed in hydrocarbon lubricating oils to increase viscosity index and to decrease oil consumption when the compounded oils are employed in motors. The polymerization products having molecular weights of 50,000 or more, can be employed in small proportions to substantially increase the viscosity of fluent liquid hydrocarbon oils and as gelling agents for such oils.

The polymers produced by the present process can also be subjected to chemical modifying treatments, such as halogenation, halogenation followed by dehalogenation, sulfo-halogenation by treatment with sulfuryl chloride or mixtures of chlorine and sulfur dioxide, sulfonation, and other reactions to which hydrocarbons may be subjected. The polymers of our invention can also be cross-linked by high energy X-rays (about 0.5 to 2.5 m.e.v. or more)

or by radioactive materials or can be chemically cross-linked to effect increases in softening temperature, etc.

Obviously many changes may be made in the above described examples and procedure without departing from the scope of the invention. For example, although only surface chlorinated, brominated and iodinated oxides of metals from the specified groups were mentioned in the above examples, surface fluorinated oxides of the same metals are also suitable for the purposes of the present invention. For example, surface fluorinated molybdena is entirely suitable.

Also, coformed oxides of two or more different metals of group Va, VIa, VIIa or period 4 of group VIIIB or an oxide of one of said metals coformed with or mixed with other compounds are suitable for the purposes of the present invention. For example, silicates or metal silicates of the same metals can be utilized in place of the oxides as the base material for halogenation.

Accordingly, it is intended that the above disclosures be regarded as illustrative and as in no way limiting the scope of the invention.

What I claim is:

1. A process for polymerizing α-mono-olefins and mixtures thereof which comprises contacting at temperatures between about −20° C. and 250° C. a substance chosen from the group consisting of the α-mono-olefins and mixtures thereof, with a catalyst comprising an oxide of a metal chosen from the group consisting of the metals of group Va, VIa, VIIa and period 4 of group VIIIB having halogen chemically bound thereto, said oxide being substantially free of hydrocarbon soluble compounds, and a compound conforming to the general formula:

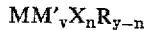

wherein M is chosen from the group consisting of the metals of groups I, II and III; M′ is a metal of group I; $v$ is an integer chosen from the group consisting of 0 and 1; each X is any halogen; $n$ is an integer chosen from the group consisting of 0, 1 and 2; each R is chosen from the group consisting of any monovalent hydrocarbon radical and hydrogen; $y$ is an integer equal to the combined valence represented by M and M′ and thus is an integer chosen from the group consisting of 1, 2, 3 and 4; and wherein $y-n$ equals at least one.

2. The process of claim 1 wherein said oxide is chosen from the group consisting of oxides having chlorine bound thereto, oxides having bromine bound thereto, and oxides having iodine bound thereto.

3. The process of claim 1 wherein said oxide has chlorine found thereto.

4. The process of claim 1 wherein said compound conforming to the general formula:

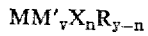

is an aluminum alkyl.

5. The process of claim 1 wherein said compound conforming to said general formula:

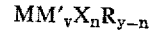

is triisobutylaluminum.

6. The process of claim 1 wherein the polymerization reaction is carried out in the presence of hydrogen.

7. An improved catalyst for polymerizing α-mono-olefins and mixtures thereof which comprises an oxide of a metal chosen from the group consisting of metals of group Va, VIa, VIIa, and period 4 of group VIIIB having halogen chemically bound thereto, said oxide being substantially free of hydrocarbon soluble compounds, and a compound chosen from the group consisting of a group I, II and III metal conforming to the general formula:

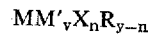

wherein M is chosen from the group consisting of the metals of group I, II and III; M′ is a metal of group I; $v$ is an integer chosen from the group consisting of 0 and 1; each X is any halogen; $n$ is an integer chosen from the group consisting of 0, 1 and 2; each R is chosen from the group consisting of any monovalent hydrocarbon radical and hydrogen; $y$ is an integer equal to the combined valence represented by M and M′ and thus is an integer chosen from the group consisting of 1, 2, 3 and 4; and wherein $y-n$ equals at least one.

8. The catalyst of claim 7 wherein said oxide is chosen from the group consisting of oxides having chlorine bound thereto, oxides having bromine bound thereto, and oxides having iodine bound thereto.

9. The catalyst of claim 8 wherein said compound conforming to the general formula:

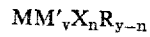

is an aluminum alkyl.

References Cited in the file of this patent

UNITED STATES PATENTS

| | | |
|---|---|---|
| 2,154,527 | Pier et al. | Apr. 18, 1939 |
| 2,824,089 | Peters et al. | Feb. 18, 1958 |
| 2,886,561 | Reynolds et al. | May 12, 1959 |
| 2,908,669 | Hagemeyer et al. | Oct. 13, 1959 |
| 2,908,674 | Nowlin et al. | Oct. 13, 1959 |
| 2,910,461 | Nowlin et al. | Oct. 27, 1959 |
| 2,912,421 | Juveland et al. | Nov. 10, 1959 |
| 2,920,062 | McFarland | Jan. 5, 1960 |
| 3,007,905 | Bailey | Nov. 7, 1961 |

FOREIGN PATENTS

| | | |
|---|---|---|
| 807,204 | Great Britain | Jan. 7, 1959 |

OTHER REFERENCES

Mellor: "Comprehensive Treatise on Inorg. and Theo. Chem.," published by Longmans, Green and Co. (N.Y.), 1931, pages 392, 399 and 628.

UNITED STATES PATENT OFFICE
CERTIFICATE OF CORRECTION

Patent No. 3,105,066                 September 24, 1963

James C. MacKenzie

It is hereby certified that error appears in the above numbered patent requiring correction and that the said Letters Patent should read as corrected below.

Column 1, line 24, for "catlayst" read -- catalyst --; column 2, line 31, strike out "the"; column 9, line 51, for "found" read -- bound --.

Signed and sealed this 4th day of August 1964.

(SEAL)
Attest:

ERNEST W. SWIDER                         EDWARD J. BRENNER
Attesting Officer                          Commissioner of Patents